(12) United States Patent
Altan et al.

(10) Patent No.: US 9,267,546 B2
(45) Date of Patent: Feb. 23, 2016

(54) PROPSHAFT DAMPER AND METHOD OF ASSEMBLY

(71) Applicant: Vibracoustic North America, L.P., Farmington Hills, MI (US)

(72) Inventors: Atilla Altan, Breisach (DE); Timo Armbruster, Zell am Harmersabach (DE); Niklas Mueller, Ihringen (DE); Frederik Goetz, Breisach (DE); Markus Duerre, Ann Arbor, MI (US)

(73) Assignee: Vibracoustic North America, L.P., Farmington Hills, MI (US)

( * ) Notice: Subject to any disclaimer, the term of this patent is extended or adjusted under 35 U.S.C. 154(b) by 0 days.

(21) Appl. No.: 14/105,348

(22) Filed: Dec. 13, 2013

(65) Prior Publication Data
US 2014/0171208 A1 Jun. 19, 2014

Related U.S. Application Data

(60) Provisional application No. 61/776,945, filed on Mar. 12, 2013, provisional application No. 61/736,771, filed on Dec. 13, 2012.

(51) Int. Cl.
*F16D 3/70* (2006.01)
*F16D 3/76* (2006.01)
(Continued)

(52) U.S. Cl.
CPC ............... *F16D 1/033* (2013.01); *F16D 1/076* (2013.01); *F16D 3/70* (2013.01); *F16D 3/76* (2013.01); *F16F 15/1442* (2013.01); *F16D 3/387* (2013.01); *F16D 2003/22326* (2013.01); *F16D 2300/22* (2013.01); *Y10T 29/49826* (2015.01); *Y10T 464/40* (2015.01); *Y10T 464/50* (2015.01)

(58) Field of Classification Search
CPC ........... B60K 17/24; F16C 11/12; F16D 3/70; F16D 3/76; F16D 3/78; F16D 1/033; F16D 1/076; F16D 3/387; F16D 2300/22; F16F 15/1245; F16F 15/126
USPC ...................... 464/127, 180; 74/574.4; 29/428
See application file for complete search history.

(56) References Cited

U.S. PATENT DOCUMENTS 2,122,837 A * 7/1938 Guy ................................. 464/71
2,972,240 A * 2/1961 Wood ............................. 464/71
(Continued)

FOREIGN PATENT DOCUMENTS

GB 779032 * 7/1957
JP 08200444 8/1996
(Continued)

*Primary Examiner* — Josh Skroupa
(74) *Attorney, Agent, or Firm* — Dinsmore & Shohl LLP; Thomas E. Anderson

(57) ABSTRACT

A propshaft damper includes an inertia ring where the inertia ring having an inner ring. A rubber track is positioned on inner ring, the rubber track having an first inner surface. A transmission flange is further provided having a second inner surface and connected to the inertia ring. A hub is provided connecting the inertia ring to the flange. The hub having a first section and a second section where the first section of the hub includes a first outer surface and the second section includes a second outer surface. The first inner surface of the hub connected to the first outer surface of the hub. Further, the second outer surface of the hub is connected to the second inner surface of the flange thereby connecting inertia track and the flange by means of the hub in a secure press-fit connection.

15 Claims, 6 Drawing Sheets

(51) Int. Cl.
*F16D 1/033* (2006.01)
*F16D 1/076* (2006.01)
*F16F 15/14* (2006.01)
*F16D 3/38* (2006.01)
*F16D 3/223* (2011.01)

(56) References Cited

U.S. PATENT DOCUMENTS

| | | | | |
|---|---|---|---|---|
| 2,999,374 | A * | 9/1961 | Kleinschmidt | 464/91 |
| 3,630,049 | A * | 12/1971 | Feller et al. | 464/93 |
| 3,746,330 | A * | 7/1973 | Taciuk | 267/137 |
| 4,178,811 | A | 12/1979 | Shepherd | |
| 4,702,722 | A * | 10/1987 | Narue et al. | 464/93 |
| 5,222,913 | A * | 6/1993 | Nagashima | 464/93 |
| 5,888,139 | A * | 3/1999 | Hoshino | 464/98 |
| 7,462,105 | B2 * | 12/2008 | Lattin | 464/71 |
| 8,591,344 | B2 * | 11/2013 | Duerre et al. | 464/92 |
| 2005/0087421 | A1 | 4/2005 | Osada et al. | |
| 2006/0183558 | A1 * | 8/2006 | Feldmann | 464/93 |
| 2007/0080534 | A1 * | 4/2007 | Rothe et al. | 285/222.1 |
| 2007/0163379 | A1 * | 7/2007 | Buck et al. | 74/574.4 |

FOREIGN PATENT DOCUMENTS

| | | |
|---|---|---|
| JP | 2010091060 A | 4/2010 |
| WO | 8804377 A1 | 6/1988 |

* cited by examiner

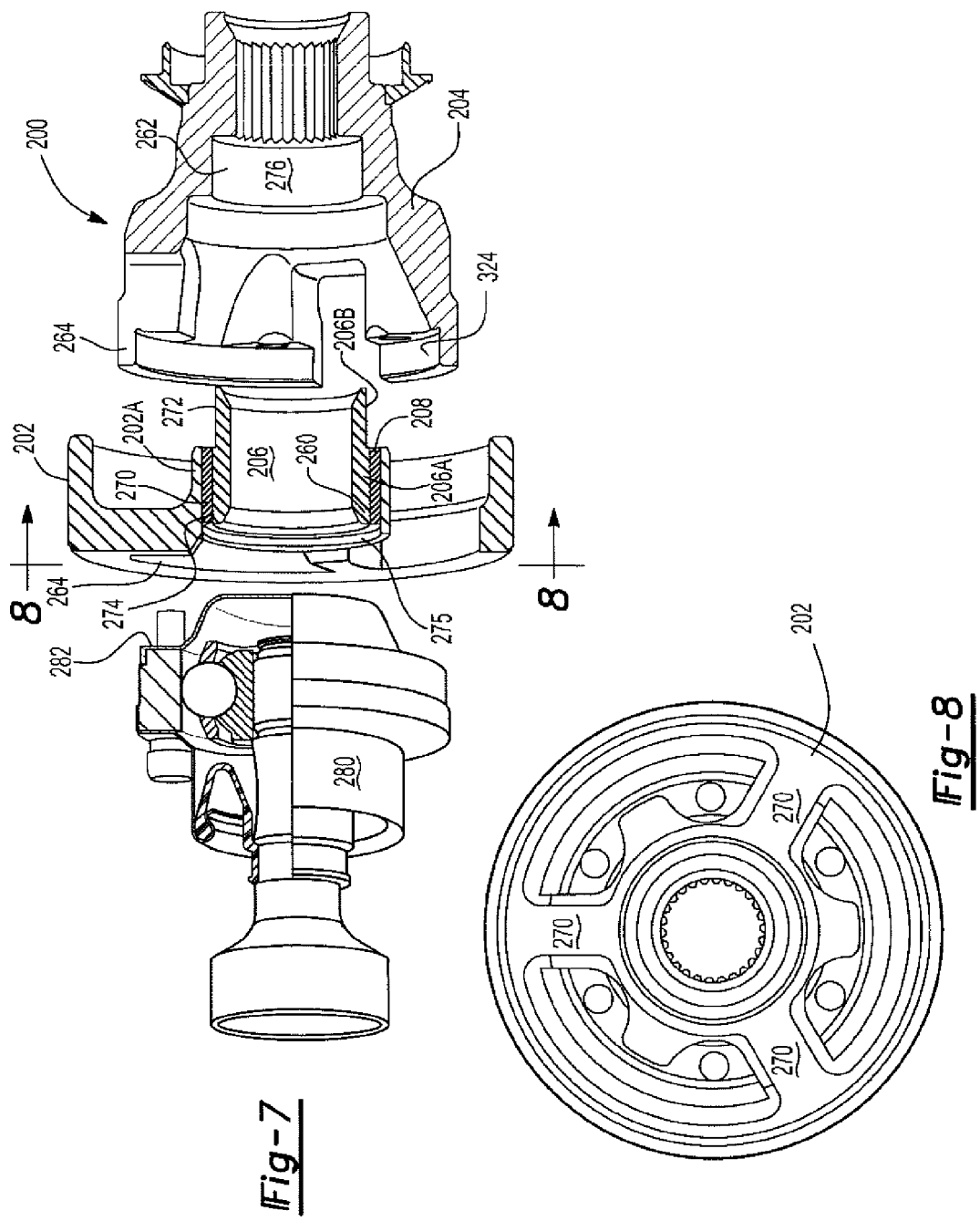

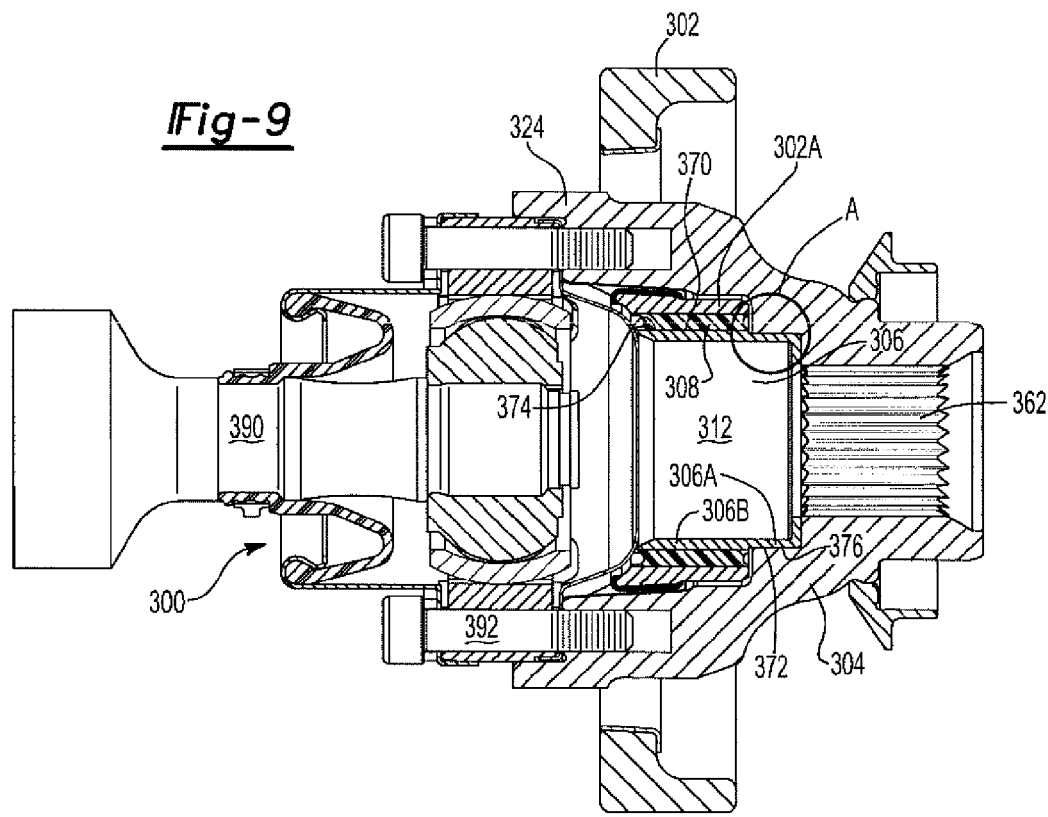

PROPSHAFT DAMPER AND METHOD OF ASSEMBLY

CROSS-REFERENCE TO RELATED APPLICATIONS

This application claims priority of U.S. Provisional Patent Application Ser. Nos. 61/736,771 filed Dec. 13, 2012 and 61/776,945 filed Mar. 12, 2013, which are both incorporated herein by reference.

FIELD OF THE INVENTION

This invention relates generally to dampers for vehicle suspension systems. More particularly, this invention relates to a propshaft damper to minimize vibration in a vehicle suspension system.

SUMMARY OF THE INVENTION

The present invention provides for a propshaft damper for a vehicle. The propshaft damper includes an inertia ring where the inertia ring having an inner ring. A rubber track is positioned on inner ring, the rubber track having an first inner surface. A transmission flange is further provided having a second inner surface and connected to the inertia ring. A hub is provided connecting the inertia ring to the flange. The hub having a first section and a second section, the first section of the hub having a first outer surface and the second section having a second outer surface. The first inner surface of the hub connected to the first outer surface of the hub. Further, the second outer surface of the hub is connected to the second inner surface of the flange thereby connecting inertia track and the flange by means of the hub in a secure press-fit connection, or a fastener. The present invention offers the possibility to assemble a damper between two flanges without using a deep drawn stamping or a following assembly of inertia ring with subassembly.

BACKGROUND OF THE INVENTION

Noise is a common customer complaint within the interior compartment of a vehicle. The firings of cylinders in an internal combustion engine of a vehicle may generate torsional vibrations thus causing noise heard by the user of the vehicle. These periodic firings generate torsional vibrations as a fixed order of the engine rpm. An excitation sweep starting at idle up to the maximum engine speed is measured and graphically depicted. Various multiple degrees of freedom have several eigenforms per its inertia, torsional rates, and dampening. Each eigenform has a certain frequency, vibration shape, and resonant application. Systems not having dampers on the propshaft exhibit higher frequency versus amplification on a system with amplifying eigenmode (resonance) not having dampers on the propshaft.

The noise and vibration of an amplified eigenmode in resonance heard by the user of the vehicle is significantly reduced through the use of torsional propshaft dampers. The propshaft damper works as an added single degree of freedom system tuned to the problem eigenform of the driveline. FIG. 2 illustrates the graph 30 showing frequency versus amplification of the reduction of torsional resonant vibration when using a damper at line 34 and not having a damper at line 32. Line 34 is an example of the frequency versus amplification of the present invention.

Several known propshaft dampers exist such as a damper having rotating support pins and being pressed onto a flange/shaft OD. Other dampers includes a damper having a track but assembled with a rubber coupling and being pressed to an OD of a flange protrusion which accommodates a center sleeve. Other dampers include a damper having a rubber coupling or a propshaft damper pressed to a minimum shaft flange accommodated into a cv-joint. Even further, these dampers all require the user of a bolt or other fastener for assembly. The dampers of the prior art are frequently prohibitively expensive to manufacture when assembled between a u/cv-joint and a transmission flange because of the number of components required, the weight and assembly costs. As such, there exists a need in the art to provide a propshaft damper producing effective results at a lower cost.

BRIEF DESCRIPTION OF THE DRAWINGS

FIG. 7 is a partially exploded, partial cross-sectional perspective view of a second embodiment of the damper of the present invention;

FIG. 8 is a side view of the second embodiment of the damper of the present invention;

FIG. 9 is a cross-sectional side view of a third embodiment of the damper of the present invention;

FIG. 10 is a cross-sectional perspective view of the third embodiment of the damper of the present invention;

DETAILED DESCRIPTION OF THE DRAWINGS

Figure 1:
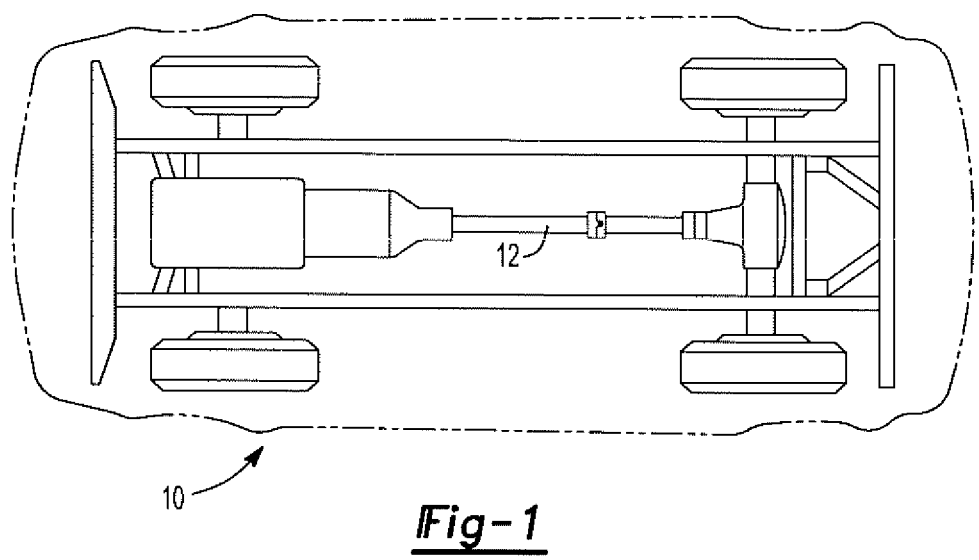
FIG. 1 illustrates a vehicle having a propshaft and propshaft damper positioning.
Figure 2:
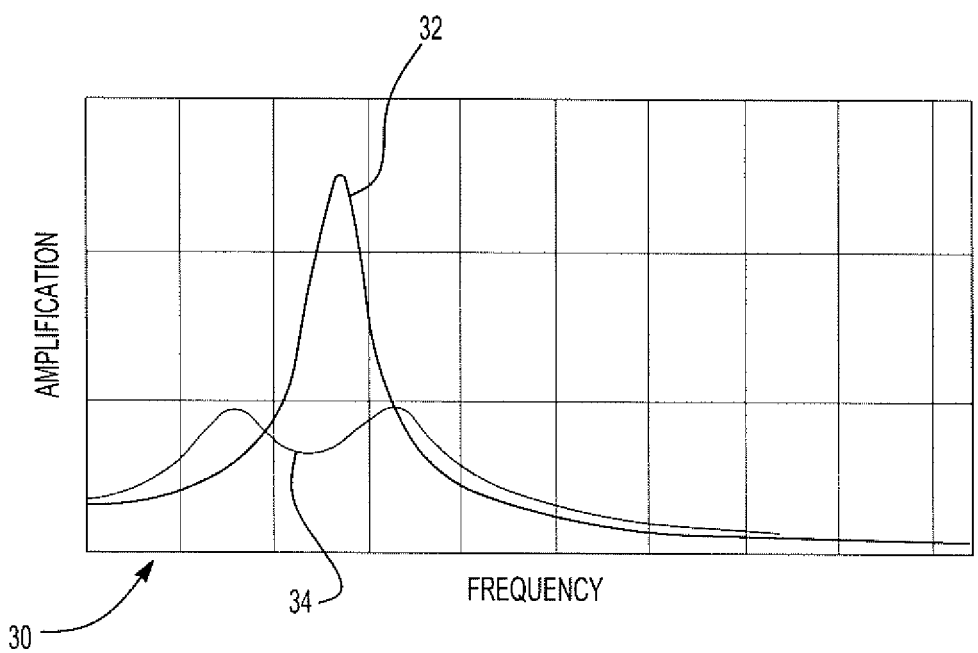
FIG. 2 is a graphical representation of frequency versus amplification of a vehicle with and without propshaft dampening at resonant amplification.

The present invention provides for an improved propshaft damper having a centered rubber track. The centered rubber track provides sufficient radial damper rate for balancing and a cost savings through the reduced number of components (i.e., no friction bearings or support pins), improved durability through less rubber strain, and a robust design without dirt contamination or wear. The propshaft damper includes an inertia ring where the inertia ring having an inner ring. The rubber track is positioned on inner ring, the rubber track having an first inner surface.

A transmission flange is further provided having a second inner surface and connected to the inertia ring. A hub is provided connecting the inertia ring to the flange. The hub having a first section and a second section, the first section of the hub having a first outer surface and the second section having a second outer surface. The first inner surface of the hub connected to the first outer surface of the hub. Further, the second outer surface of the hub is connected to the second inner surface of the flange thereby connecting inertia track and the flange by means of the hub in a secure press-fit connection.

Previously known damper assemblies having a centered rubber track include a press fit hub to the minimum diameter of shaft flange, a press fit to protrusion of the multi arm flange, or bolted between a transmission and CV/U-joint flange. The present invention offers the possibility to assemble a damper between two flanges without using a deep drawn stamping or a following assembly of inertia ring with subassembly.

The flange of the present invention requires an inner diameter having a press fit tolerance. The flange further must include areas of protrusion or recession so that the inertia ring with apertures can move in the same plane without contacting the flange.

FIGS. 3-6 illustrate the components of the propshaft damper 100 of the present invention. The damper 100 includes an inertia ring 102, a damper hub 106 and a centered rubber track 108. The inertia ring 102 is connected to the damper hub 106 through molding/vulcanization of the rubber in the rubber track 108. The rubber of the rubber track is molded directly (i.e. integrated) to the metal of inertia ring 102 (i.e. vulcanization). The rubber track 108 is centered (i.e. close to the rotating axis) as close as possible to provide sufficient radial stiffness. The centered nature of the track 108 will ensure optimized balance properties with the need for support pins. The rubber track 108 negates the need for fasteners or other support pins.

The hub 106 is further provided in the center of the inertia ring 102. The rubber of the rubber track 108 is defined as rubber, polymers, plastics, polymer-like or plastic-like materials. The hub 106 may be a cut and machined steel, other metal, plastic, plastic-like, polymer or polymer-like tube. The present invention provides for a single mounting plane through a plurality of transmission flange protrusions and an optimized alignment through press fit area in the machined tube. Alternatively, the protrusions may be provided on the shaft flange. The transmission flange or a shaft flange includes a plurality protrusions which extend through the apertures of the inertia ring connecting to the other of the transmission flange or the shaft flange.

The inertia ring 102 is a casting (without a subassembly) having low tooling cost. The inertia ring 102 further includes an inner ring 175, or generally circular inner portion positioned close to the drive shaft. In the present embodiment, the inertia ring is made of a cast iron. Other metals or sinter metals may be used to produce the inertia ring. The inertia ring includes a plurality of apertures 120a, 120b. The apertures, or travel limiters, 120a, 120b may further include a rubber or plastic coating to operate as a travel limiter without generating any further noise. The apertures 120a, 120b may be include a separate rubber snubber to form the snubber surface attached as a separate component. This rubber coating or snubber reduces noise and preserves the inertia ring in the event of a collision.

Figure 3:
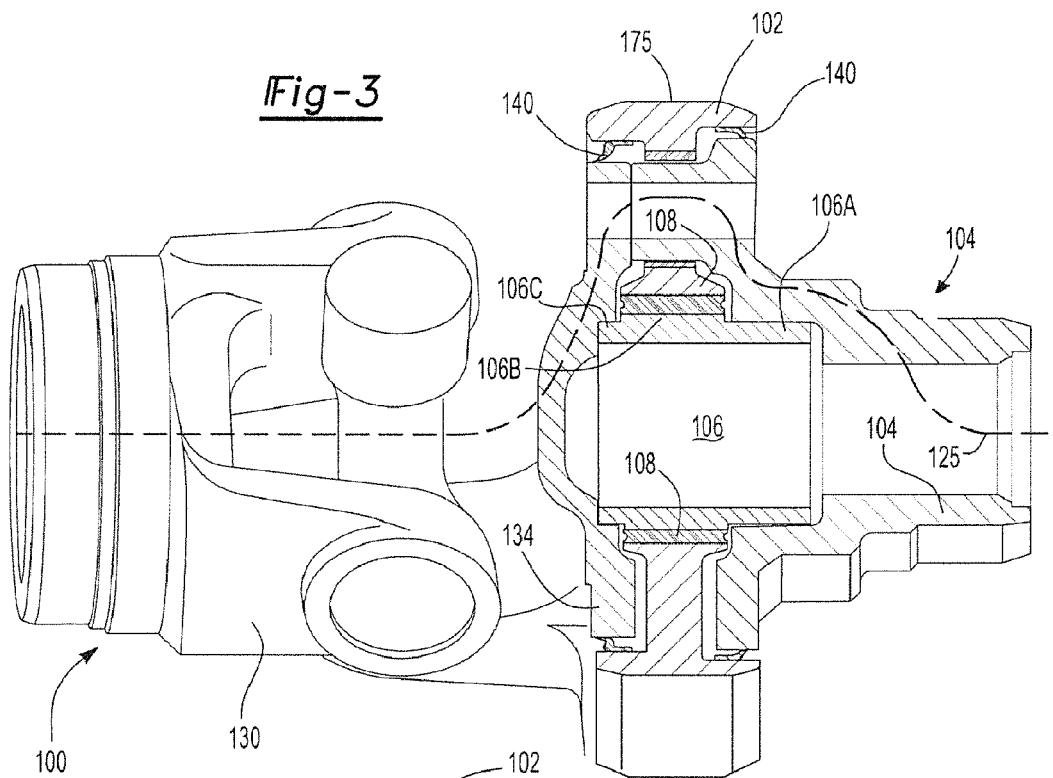
FIG. 3 is a partial cross-sectional view and partial perspective view of the first embodiment of the damper of the present invention.

The coatings 122 are provided on an inner surface of the apertures 120a, 120b. The coatings (or surfaces) 122 are molded directly (i.e. integrated) to the inertia ring 102. This molding/vulcanization process of molding the coatings 122 may take place at the same time as the rubber track 108 is molded to the inertia ring 102 to save time and money in the manufacturing process. Integrated sealing lips 140, as shown in FIG. 3, are further provided to increase protection against dirt and excessive heat. The sealing lips 140 may also be molded at the same time as the molding of the rubber track 108 and the coatings 122.

The flange 104 includes a plurality of protrusions 124. In the present embodiment, the protrusions 124 are generally cylindrical having an outer circumference 125 and an upper surface 127. In further embodiments, the protrusions will vary in size and dimension (as in the flanges of FIGS. 19-22) and are not limited to a cylindrical configuration. The protrusions 124 are adapted to engage with the apertures 120 located on the inertia ring 102. The protrusions 124 extend through the apertures 120a, 120b, etc. allowing the inertia ring to move relative to the flange to move together on the same plane without the flange 104 contacting the inertia ring 102. The inertia ring and hub 106 are press fit into the flange 104.

Figure 4:
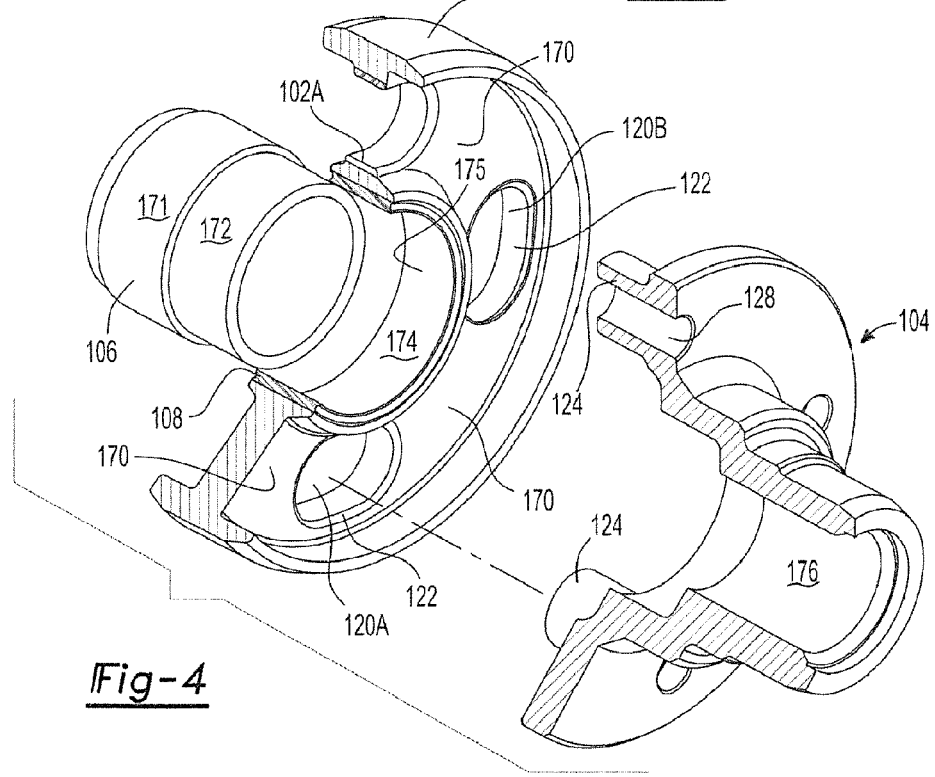
FIG. 4 is a partial cross-sectional perspective exploded view of the first embodiment of the damper of the present invention.
Figure 5:
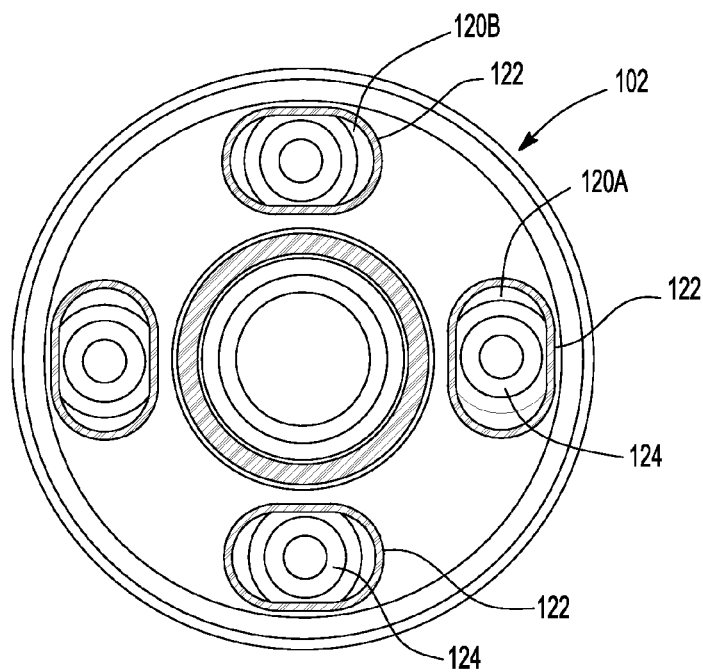
FIG. 5 is a side view of the first embodiment of the damper of the present invention.

A plurality of spokes 170 are positioned between the apertures 120a, 120b. These spokes are defined as the space between the apertures 120a, 120b extending between the inner ring and the outer ring. In the present embodiments as shown in FIG. 4, the spokes 170 are wide. In other embodiments (such as shown in FIG. 8), the spokes are more narrow and appear more like traditional spokes.

Figure 6:
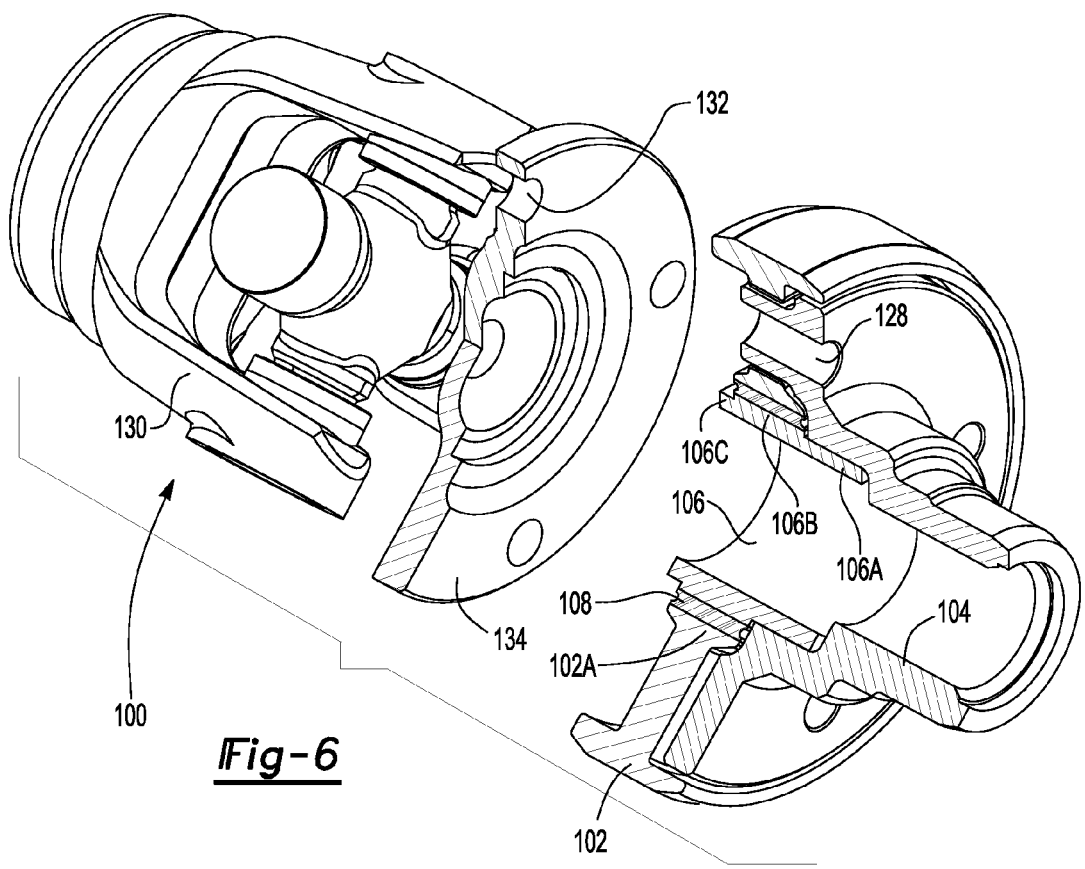
FIG. 6 is a partially exploded perspective view of the first embodiment of the damper of the present invention.

FIG. 6 illustrates the relation of the u-joint 130 (of the propshaft) to the damper 100. An aperture 132 located on a shaft flange 134 of the propshaft connects to the protrusion 124 of the flange 104. The protrusion 124 of the flange 104 includes an aperture 128 extending through the protrusion 124. A bolt then extends through the aperture 132 through the aperture 128 of the flange 104 and thus accordingly through the aperture 120 of the inertia ring thereby aligning the propshaft with the transmission flange 104 and allowing the inertia ring to rotate on the same plane as the flange 104 and protrusions 124.

FIGS. 4 and 6 illustrates the damper 100 in relation to the u-joint 130. The inertia ring further includes dirt detracting chamfers 140 located on an outer edge of the inertia ring 102. The outer surface 175 of the inertia ring 102 acts as a temperature shield to prevent high temperatures from the closely located exhaust from damaging the rubber track 108. The flange 104 and the u-joint (flange) 130 also act as temperature shields for the rubber track 108. FIG. 14 illustrates a centered rubber track 108 located on the inertia ring 102.

FIG. 3 illustrates yet another improvement of the present invention. A torque flow 125 is shown through the flange 104 and the u-joint (and flange of the u-joint 130). The torque is not transmitted to the damper 100. This permits the damper 100 to be made of lighter material and allows the damper to serve only its primary purpose of dampening.

The hub 106 illustrates a 3-section configuration. The hub 106 further includes sections 106A, 106B and 106C. The sections 106A, 106B and 106C include varying outer diameters allowing for easier and/or more secure connections between the flanges. By way of example, the OD of section 106A is configured to press-fit with the flange 104. The change in the OD over the varying sections provides for alignment of the flange 104 and the flange of the u-joint 130. Section 106B provides for an OD for the rubber track 108. Section 106C provides for an intermediate fit for further aligning the hub 106 with the u-joint 103 (or shaft flange 134 of the u-joint 130). The third section 106C accommodates an inner surface of a shaft flange to align the shaft flange 134.

These arrangements allow for accurate alignment of the damper 100 with the flange 104 (and the flange of the u-joint 130). The hub 106 may include more or less sections (i.e. 2, 3, 4, 5 . . . etc.) according to the need for alignment and based on customer need.

FIGS. 3 and 6 illustrate the u-joint 130 connected to the flange 104. The inertia ring 102 further includes sealing lips 140 providing for complete encapsulation against dirt and heat through the vulcanized sealing lips 140. The integrated sealing lips 140 prevent dirt and heat from entering the system.

The flange 104 further includes protrusions 124 extending through the aperture of the inertia ring 102. The flange connects to the inertia ring by means of a press fit configuration. Specifically, the hub 106 further includes a first outer surface 171 and a second outer surface 172. The first outer surface 171 connects to an outer surface 174 of the rubber track 108 of the inertia ring 102. Further, the second outer surface 172 of the hub 106 connects to an inner surface 176 of the flange 104. These connections are made in a press-fit arrangement to create a secure connection. Alternatively, the hub, flange and inertia ring are bond molded together, optionally molded together at the same time as the rubber coating on the apertures.

FIGS. 7-8 illustrate a second embodiment of the present invention. A damper assembly 200 discloses the damper concept between a cv-joint 280 and transmission flange 204. The inertia ring 202 is connected through the rubber track 208 with the damper hub 206. The rubber track 208, similar to rubber track 108 of the first embodiment, may also have an L-shaped configuration. The inertia ring 202 further includes an inner ring 275, or generally circular inner portion positioned close to the drive shaft. The damper hub 206 is connected to the transmission flange 204 with a press fit configuration. The damper hub, in the present embodiment, includes a 2-section configuration including section 206A and section 206B. This 2-section configuration provides for simplified and accurate alignment. The OD of section 206B provides a press-fit connection to the transmission flange 204 to securely connected to an inner surface (and inner diameter) 262 of the transmission flange 204. A secondary flange alignment between the transmission flange 204 at 264 and the cv-joint at point 282. Integrated sealing lips 260 are adapted to prevent dirt contamination.

Rubber coated spokes 270 are provided on the inertia ring 202 to prevent noise when travel limiting. The apertures 220 of the inertia ring 202 are larger in size to accommodate the protrusions 224 of the transmission flange 204.

The flange 204 further includes protrusions 224 extending through the aperture of the inertia ring 202. The flange connects to the inertia ring by means of a press fit configuration. Specifically, the hub 206 further includes a first outer surface 270 and a second outer surface 272. The first outer surface 270 connects to an outer surface 274 of the rubber track 208 of the inertia ring 202. Further, the second outer surface 272 of the hub 206 connects to an inner surface 276 of the flange 204. These connections are made in a press-fit arrangement to create a secure connection.

In a third embodiment as shown in FIGS. 9-10, the damper hub includes a press fit configuration and a mounting surface for a shaft nut. Damper assembly 300 discloses the damper concept between a cv-joint 390 and transmission flange 304. The transmission flange 304 includes a hatched inner surface 362 providing for a secure connection with a bolt or other fastener.

The inertia ring 302 is connected through the rubber track 308 with the damper hub 306. The inertia ring 302 further includes an inner ring 375, or generally circular inner portion positioned close to the drive shaft. The rubber track 308, similar to rubber track 108 of the first embodiment, may also have an L-shaped configuration. The damper hub 306 is connected to the transmission flange 304 with a press fit configuration (press fit for pre-assembly). The OD of section 306a provides a press-fit connection to the transmission flange 304. This connection is shown in highlighted section A The OD of the section 306b connects to the rubber track 308 of the inertia ring 302. A plurality of bolts 392 are provided connecting the joint 390 to the transmission flange 304.

A mounting surface 310 for a shaft nut (not shown) is provided on the damper hub 306. The mounting surface is generally perpendicular to an inner surface 312 of the damper hub 306. The mounting surface 310 extends away from the inner surface 312 of the damper hub 306 into a center portion of the damper hub 306. The mounting surface 310 is provided to allow a nut or bolt head to rest thereon when extending through the damper assembly 300.

The flange further includes protrusions 324 extending through the aperture of the inertia ring 302. The flange connects to the inertia ring by means of a press fit configuration. Specifically, the hub 306 further includes a first outer surface 370 and a second outer surface 372. The first outer surface 370 connects to an outer surface 374 of the rubber track 308 of the inertia ring 302. Further, the second outer surface 372 of the hub 306 connects to an inner surface 376 of the flange 304. These connections are made in a press-fit arrangement to create a secure connection.

Figure 11:
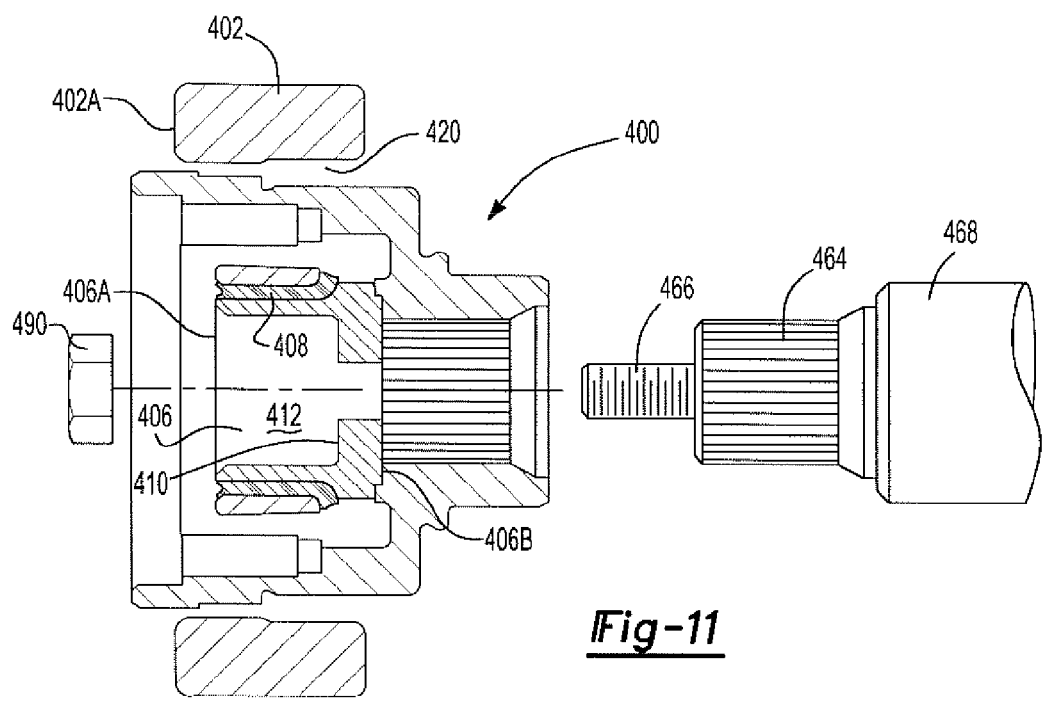
FIG. 11 is a cross-sectional view of a fourth embodiment of the damper of the present embodiment.
Figure 12:
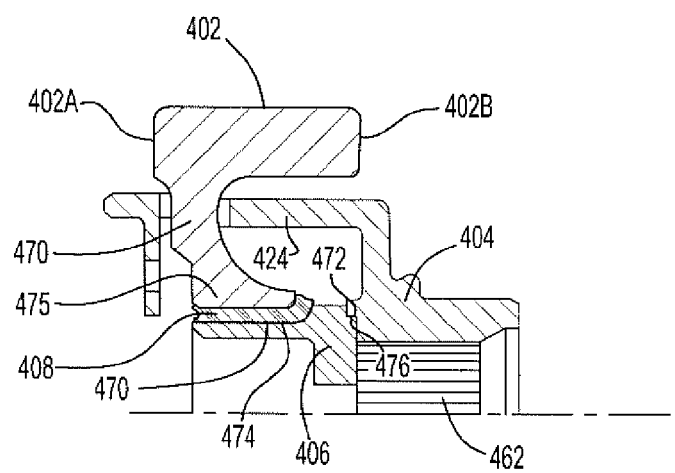
FIG. 12 is an alternative cross-sectional view of the fourth embodiment of the damper of the present invention.

In a fourth alternative embodiment as shown in FIGS. 11-12, the damper hub includes a bolted hub configuration and a mounting surface for a shaft nut. Damper assembly 400 discloses the damper concept between a cv-joint and transmission flange 404. The inertia ring 402 is connected through the rubber track 408 with the damper hub 406. The inertia ring 402 further includes an inner ring 475, or generally circular inner portion positioned close to the drive shaft. The rubber track 408, similar to rubber track of the first embodiment, may also have an L-shaped configuration.

The damper hub 406 includes a first surface 406a and a second surface 406b. Further, the inertia ring 402 includes a first surface 402a and a second surface 402b. In the present embodiment, the first surface 406a of the hub 406 is generally in line and parallel with the first surface 402a of the inertia ring. Correspondingly, the second surface 406b of the hub 406 is generally in line and parallel with the second surface 402b of the inertia ring. Various other embodiments illustrate the second surface 406b extending past the second surface 402b of the inertia ring 402, and then press fit into a flange. The hub 406 of the present embodiment is not press fit into the flange 404. Rather, the hub 406 will be bolted to the flange 404 by means of a bolt 466 (and corresponding drive shaft structure 464, 468) and nut 490.

The hub further includes a first outer surface 470 and a second outer surface 472. The first outer surface 470 connects to an outer surface 474 of the rubber track 408 of the inertia ring 402. Further, the second outer surface 472 of the hub 406 connects to an inner surface 476 of the flange 404.

A mounting surface 410 for a shaft nut and bolt 490 is provided on the damper hub 406. The mounting surface is generally perpendicular to an inner surface 412 of the damper hub 406. The mounting surface 410 extends away from the inner surface 412 of the damper hub 406 into a center portion of the damper hub 406. The mounting surface 410 is provided to allow a nut or bolt head to rest thereon when extending through the damper assembly 400.

Rubber coated spokes 470 are provided on the inertia ring 402 to prevent noise when travel limiting. The apertures 420 of the inertia ring 402 are larger in size to accommodate the protrusions 424 of the transmission flange 404. The present invention further includes a method of assembly of the above embodiments of the damper assembly. The method of assembling propshaft damper having a hub, an inertia ring and a transmission flange is provided including the steps of applying a rubber track to an inner ring of the inertia ring, the rubber track having an inner surface. The rubber may be applied as a separate piece or molded to the metal. The method further includes the step of applying a rubber surface to a plurality of apertures on the inertia ring, the rubber of the apertures applied at the same time the rubber track is applied to the inner ring of the inertia ring. Again, the rubber may be applied as a coat (such as molded to the metal) or attached as a separate component. The method then includes the steps of connecting a first section of the hub to the inner surface of the rubber track in a press-fit configuration and connecting a second section of the hub to an inner surface of a transmission flange in a press fit configuration. Alternatively, the hub, the transmission flange and the inertia ring may be molded together. This alternate method requires molding a first section of the hub to the inner surface of the rubber track and molding a second section of the hub to an inner surface of the transmission flange. All of the components above may be connected via mold bonding or a press-fit configuration.

The invention is not restricted to the illustrative examples and embodiments described above. The embodiments are not intended as limitations on the scope of the invention. Methods, apparatus, compositions, and the like described herein are exemplary and not intended as limitations on the scope of the invention. Changes therein and other uses will occur to those skilled in the art. The scope of the invention is defined by the scope of the appended claims.

The invention claimed is:

1. A propshaft damper for a vehicle, the propshaft damper comprising:
    an inertia ring, the inertia ring having an outer ring and an inner ring, the inner ring having an inner diameter, the inertia ring having a plurality of apertures, the apertures separated by a plurality of spokes;
    a rubber track positioned on the inner diameter of the inner ring of the inertia ring, the rubber track having an inner surface, the rubber track is located spaced apart from but close to a rotating axis of the damper;
    a damper hub having a first section and a second section, the first section of the hub having an outer surface, the second section having an outer surface, the inner surface of the rubber track connected to the outer surface of the first section of the hub, the outer surface of the second section of the hub directly connected to an inner surface of a flange, the flange comprising a plurality monolithically formed protrusions which extend through the apertures of the inertia ring.

2. The propshaft damper of claim 1 where the flange is a transmission flange.

3. The propshaft damper of claim 1 where the flange is a shaft flange.

4. The propshaft damper of claim 1 wherein the inner surface of the rubber track has a press-fit tolerance to securely connect the rubber track to the outer surface of the first section of the hub.

5. The propshaft damper of claim 1 wherein the outer surface of the rubber track has a press-fit tolerance to securely connect to the inner surface of the inner ring of the inertia ring.

6. The propshaft damper of claim 1 wherein the inner surface of the flange has a press-fit tolerance to securely connect the flange to the outer surface of the second section of the hub.

7. The propshaft damper of claim 1 wherein the hub, the rubber track and the inertia ring are mold bonded together.

8. The propshaft damper of claim 1 wherein the inertia ring includes at least one sealing lip extending axially around the inertia ring.

9. The propshaft damper of claim 1 wherein the apertures include a rubber surface.

10. The propshaft damper of claim 9 wherein the rubber surface of the apertures and the rubber track of the inertia ring are molded simultaneously through mold bonding.

11. The propshaft damper of claim 9 wherein the rubber surface of the apertures are installed as a separate snubber.

12. A method of assembling the propshaft damper of claim 1 comprising the steps of:
    applying the rubber track to the inner ring of the inertia ring;
    applying a rubber surface to a plurality of apertures on the inertia ring;
    connecting the outer surface of the first section of the hub to the inner surface of the rubber track; and
    directly connecting an outer surface of a second section of the hub to an inner surface of the flange.

13. A propshaft damper for a vehicle, the propshaft damper comprising:
    an inertia ring, the inertia ring having an outer ring and an inner ring, the inner ring having an inner diameter, the inertia ring having a plurality of apertures, the apertures separated by a plurality of spokes;
    a rubber track positioned on the inner diameter of the inner ring of the inertia ring, the rubber track having an inner surface, the rubber track is located spaced apart from but close to a rotating axis of the damper;
    a damper hub having a first section, a second section and a third section, the first section of the hub having an outer surface, the second section having an outer surface, the inner surface of the rubber track connected to the outer surface of the first section of the hub,
    the outer surface of the second section of the hub directly connected to an inner surface of a first flange; and
    the third section having an outer surface, the outer surface of the third section connected to an inner surface of a second flange to align the first flange and the second flange with respect to each other.

14. The propshaft damper of claim 13 wherein the first flange is either a transmission flange or a shaft flange.

15. The propshaft damper of claim 14 wherein the second flange is the other of the transmission flange or the shaft flange.

* * * * *